(12) United States Patent
Magliocca et al.

(10) Patent No.: US 8,307,719 B2
(45) Date of Patent: Nov. 13, 2012

(54) APPARATUS FOR MEASURING VOLUME- OR MASS-FLOW OF A MEDIUM IN A PIPELINE

(75) Inventors: Antonio Magliocca, Oberwil (CH); Alexander Stünzi, Ettingen (CH); Oliver Graf, Känerkinden (CH)

(73) Assignee: Endress + Hauser Flowtec AG, Reinach (CH)

( * ) Notice: Subject to any disclaimer, the term of this patent is extended or adjusted under 35 U.S.C. 154(b) by 410 days.

(21) Appl. No.: 12/310,553

(22) PCT Filed: Aug. 31, 2007

(86) PCT No.: PCT/EP2007/059135
§ 371 (c)(1),
(2), (4) Date: Jul. 27, 2010

(87) PCT Pub. No.: WO2008/028872
PCT Pub. Date: Mar. 13, 2008

(65) Prior Publication Data
US 2010/0294043 A1    Nov. 25, 2010

(30) Foreign Application Priority Data
Sep. 5, 2006    (DE) .......................... 10 2006 042 062

(51) Int. Cl.
*G01F 1/58* (2006.01)

(52) U.S. Cl. .................................................. 73/861.11

(58) Field of Classification Search ... 73/861.11–861.17
See application file for complete search history.

(56) References Cited

U.S. PATENT DOCUMENTS

| | | | |
|---|---|---|---|
| 3,094,000 A * | 6/1963 | Kass | 73/861.16 |
| 4,098,118 A | 7/1978 | Schmoock | |
| 4,253,340 A | 3/1981 | Schmoock | |
| 4,422,339 A | 12/1983 | Gall | |
| 5,307,688 A * | 5/1994 | Lefebvre | 73/861.16 |
| 5,551,306 A * | 9/1996 | Scarpa | 73/861.16 |
| 5,693,892 A * | 12/1997 | Batey | 73/861.12 |
| 7,421,908 B2 * | 9/2008 | Jarrell et al. | 73/861.12 |
| 7,448,281 B2 * | 11/2008 | Backer et al. | 73/861.12 |

FOREIGN PATENT DOCUMENTS

| | | |
|---|---|---|
| CN | 2179615 Y | 10/1994 |
| DE | 612 609 C | 4/1935 |
| DE | 23 32 594 A1 | 1/1975 |

(Continued)

*Primary Examiner* — Jewel V Thompson
(74) *Attorney, Agent, or Firm* — Bacon & Thomas, PLLC

(57) ABSTRACT

An apparatus for measuring volume- or mass-flow of a medium in a pipeline. The apparatus includes: a measuring tube, through which medium flows in the direction of the measuring tube axis, wherein the measuring tube has, in stream direction of the medium, a first end region and a second end region; a magnet system, which a produces a magnetic field passing through the measuring tube essentially transversely to the measuring tube axis; at least one measuring electrode coupled with the medium and arranged in a region of the measuring tube lying essentially perpendicular to the magnetic field; and a control/evaluation unit, which delivers information concerning volume- or mass-flow of the medium in the measuring tube on the basis of a measurement voltage induced in the at least one measuring electrode. In order to keep costs for the magneto-inductive flow measuring device low, the measuring tube is embodied as one-piece and the first end region and the second end region of the measuring tube are flared.

4 Claims, 3 Drawing Sheets

FOREIGN PATENT DOCUMENTS

| | | |
|---|---|---|
| DE | 3805574 A1 | 8/1989 |
| DE | 103 40 056 A1 | 5/2005 |
| DE | 10 2005 003 332 A1 | 8/2006 |
| EP | 1 519 160 A | 3/2005 |
| WO | WO 98/52001 | 11/1998 |
| WO | WO 99/36749 | 7/1999 |

* cited by examiner

APPARATUS FOR MEASURING VOLUME- OR MASS-FLOW OF A MEDIUM IN A PIPELINE

TECHNICAL FIELD

The invention relates to a magneto-inductive flow measuring apparatus for measuring volume- or mass-flow of a medium in a pipeline, wherein the medium flows through the measuring tube in the direction of the measuring tube axis. The apparatus includes: A measuring tube, which has, in the flow direction of the medium, a first end region and a second end region; a magnet system, which produces a magnetic field passing through the measuring tube, essentially transversely to the measuring tube axis; at least one measuring electrode coupled with the medium and arranged in a region of the measuring tube; and a control/evaluation unit, which, on the basis of measurement voltage induced in the at least one measuring electrode, delivers information concerning volume- or mass-flow of the medium in the measuring tube.

BACKGROUND DISCUSSION

Magneto-inductive flow measuring devices utilize, for volumetric flow measurement, the principle of electrodynamic induction, wherein charge carriers of the medium moved perpendicularly to a magnetic field induce a measurement voltage in measuring electrodes likewise arranged essentially perpendicularly to the flow direction of the medium. The measurement voltage induced in the measuring electrodes is proportional to the flow velocity of the medium averaged over the cross section of the measuring tube; it is thus proportional to volume flow. If the density of the medium is known, then the mass flow in the pipeline, or in the measuring tube, can also be ascertained. The measurement voltage is usually tapped via a measuring electrode pair arranged in the region of maximum magnetic field strength, where, thus, maximum measurement voltage is to be expected. The measuring electrodes are coupled with the medium either galvanically or capacitively.

Usually, magneto-inductive flow measuring devices are mounted via flanges into the pipeline, in which the volume flow rate of the medium is to be ascertained. The flange connections are welded pipe-flange connections, loose-flange connections, or wafers, which are mounted between two flanges secured to the pipeline. While, thus, in the case of the first two embodiments, flanges are affixed in the end regions of the measuring tube of the magneto-inductive flow measuring device, the flanges in the case of the third embodiment are mounted on the pipeline; via clamping screw-connections, the wafer is mounted between the flanges of the pipeline.

In the case of welded pipe, or tube, to flange connections, the flanges are pushed onto the two pipe, or tube, ends and welded in the desired position. Then, the pipe, or tube, is washed, ground smooth in the flange areas and galvanized for corrosion protection. There follows then the providing of the measuring tube with a liner. In order that a high-quality connection be achieved between the flanges and the measuring tube, the inner diameter of a flange must fit the outer diameter of the measuring tube within close tolerance limits. Since, in the case of this known solution, relatively close tolerance limits must be maintained for the flanges and the pipes, material costs are relatively high. Beyond that, flanges and measuring tube must be made of weldable materials.

The manufacture of wafers is similar. Wafers are measuring devices, which do not have flanges. In the case of the known manufacture of wafers, angle end-pieces are welded on the measuring tube. The angling is achieved, for example, via a deep draw method or via a flaring method. In turn, the welded joints must be ground smooth, cleaned and galvanized.

In the case of loose-flange connections, the flanges are not fixedly connected with the measuring tube, but, instead, pushed loosely onto the measuring tube. For axial affixing of the loose flanges in the installed state of the flow measuring device in the pipeline, angled or flared end-pieces are welded onto the measuring tube. Due to the welding process, it is, also here, necessary to smooth the welded joints by grinding, to clean them, and apply an anti-corrosion coating. Therefore, a magneto-inductive flow measuring device with loose flanges, likewise, requires relatively long manufacturing times and is, thus, costly to manufacture.

SUMMARY OF THE INVENTION

An object of the invention is to provide a cost-effective, magneto-inductive, flow measuring device.

The object is achieved by flaring the first end region and the second end region of the measuring tube. The angled, flared end regions are, therefore, direct components of the measuring tube and not, such as known from the state of the art, subsequently welded on as angled, flared components on the measuring tube. Thus, all of the above mentioned, additional manufacturing steps, which are necessary in the case of the known solution with welded-on, angled end-pieces, can be omitted.

In a first advantageous embodiment of the apparatus of the invention, the flared end regions of the measuring tube serve as axial stop surfaces for loose flanges. Via the loose flanges, the measuring tube is secured in the pipeline. Manufacture of the loose-flange version is accomplished according to the invention by pushing the loose flanges onto the measuring tube; then, the two end regions of the measuring tube are flared. Especially advantageous in case of the version with loose flanges is that the magneto-inductive, flow measuring device can be mounted into the pipeline in any angular position. Advantageously relative to the embodiment, wherein securement in the pipeline is via fixed flanges, the embodiment with loose flanges is also distinguished by the fact that the flanges and the measuring tube can be made of the most varied of materials, so that an optimal matching to the pertinent application is possible without problem.

A second advantageous embodiment of the apparatus of the invention provides that the flared end regions of the measuring tube are mountable to flanges secured to the pipeline. In this case, thus, the magneto-inductive flow measuring device is embodied as a wafer. In the case of this embodiment, thus, only the two end regions of the measuring tube must be flared.

Furthermore, it is provided in connection with the apparatus of the invention, that the measuring tube is equipped with a liner, wherein the liner also extends at least onto portions the flared end regions of the measuring tube. The liner can be made of all usual materials. In turn, the liner can be optimally matched to the pertinent application.

BRIEF DESCRIPTION OF THE DRAWINGS

The invention will now be explained in greater detail on the basis of the drawing, the figures of which show as follows.

DETAILED DISCUSSION

Figure 1:
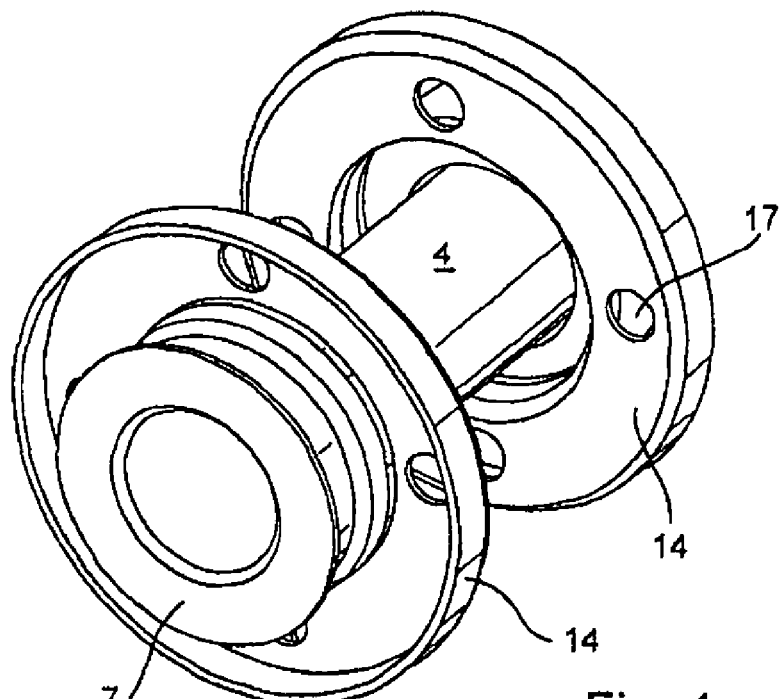
FIG. 1 a perspective sketch of an embodiment of the apparatus of the invention, with loose flanges.
Figure 2:
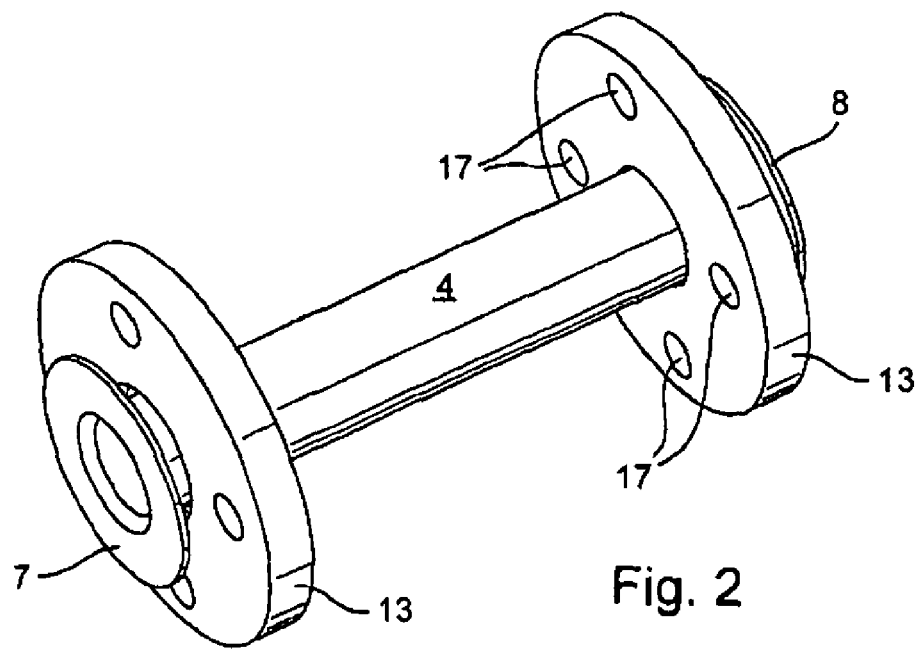
FIG. 2 a perspective sketch of an embodiment the apparatus of the invention, with loose flanges, which are of pressed sheet metal.

FIG. 1 shows a perspective sketch of an embodiment of a sensor 2 of the invention, with loose flanges 13. FIG. 2 shows a perspective sketch of an embodiment of the sensor 2 of the invention, with loose flanges 14, which are of pressed sheet metal. In both cases, the flanges 13, 14 are pushed onto the measuring tube 4; then the two end regions 7, 8 of the measuring tube are flared. The flared end regions 7, 8 serve as axial stop surfaces, when the magneto-inductive flow measuring device 1 is mounted in the pipeline 12.

The flanges 13, 14 are more cost-effective then welded-on flanges, due to their relatively large allowable tolerance limits. A further advantage of the loose-flange version of the invention is to be seen in the fact that the flanges can be manufactured of any material. Moreover, the flow measuring device 1 can be mounted in any angular position into the pipeline 12, so that demands on the positioning of the bores on the flanges 13, 14 can be relatively slight. Over all, the solution of the invention is, thus, very cost-effective.

Figure 3:
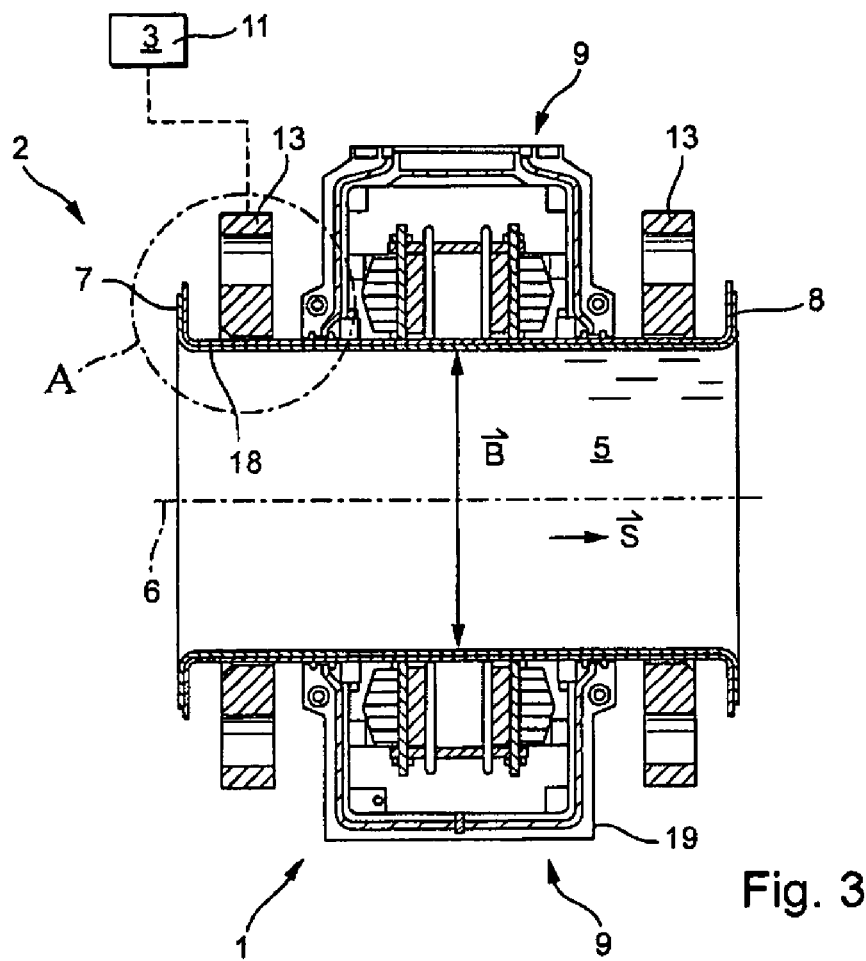
FIG. 3 a longitudinal section through a preferred embodiment of the apparatus of the invention, with loose flanges.
Figure 3A:
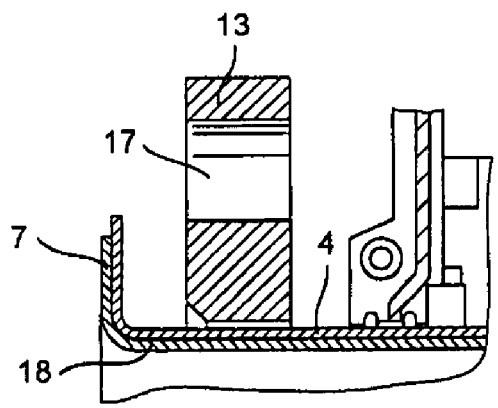
FIG. 3a an enlarged view of the detail A of FIG. 3.

FIG. 3 shows a longitudinal section through a preferred embodiment of the apparatus of the invention, with loose flanges 13. FIG. 3a shows an enlarged drawing of the detail A of FIG. 3. The two loose flanges 13 are arranged shiftably on the measuring tube 4. The end regions 7, 8 of the measuring tube 4 are flared. Measuring tube 4 is provided with a liner 18, which extends into the angled end regions 7, 8.

Applied on the perimeter of the measuring tube 4 is the magnet system 9 for producing the magnetic field B. Usually, magnet system 9 involves two diametrally arranged electromagnets, which are so operated via the control/evaluation unit 11, that they produce a magnetic field B, which periodically changes direction. Control/evaluation unit 11 is located in the transmitter 3. The measuring electrodes 10 are not shown in the longitudinal section. They are usually arranged diametrally in a plane perpendicular to the direction of the magnetic field B.

Figure 4:
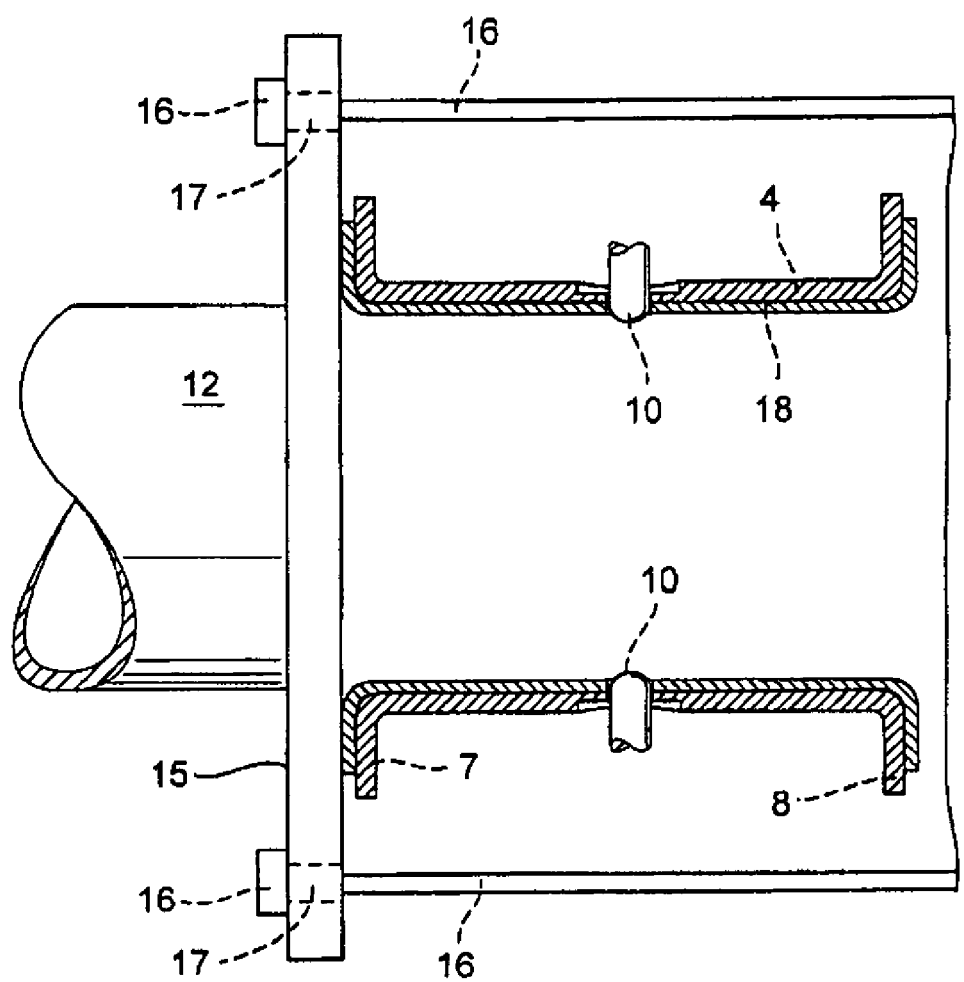
FIG. 4 a schematic drawing of a variant of the apparatus of the invention embodied as a wafer.

FIG. 4 shows a schematic drawing of a variant of the apparatus 1 of the invention embodied as a wafer. Also here, the end regions 7, 8 of the measuring tube 4 are flared. The measuring tube 4 is lined with any appropriate liner 18. Liner 18 covers, partially, the surfaces of the two angled end-pieces 7, 8, which, in the mounted state, face the flanges 15. Via the securement apparatus 16, 17, the wafer is clamped between two flanges 15, only one of which is shown in FIG. 4. The two flanges 15 are mounted fixedly to the pipeline 12.

The invention claimed is:

1. An apparatus for measuring volume- or mass-flow of a medium in a pipeline, comprising:
    a measuring tube, through which medium flows in the direction of said measuring tube axis, wherein the measuring tube has, in the stream direction of the medium, a first end region and a second end region;
    a magnet system, which produces a magnetic field passing through said measuring tube essentially transversely to the direction of said measuring tube axis;
    loose flanges;
    at least one measuring electrode coupled with the medium and arranged in a region of said measuring tube lying essentially perpendicular to the magnetic field; and
    a control/evaluation unit, which delivers information concerning volume- or mass-flow of the medium in said measuring tube on the basis of a measurement voltage induced in said at least one measuring electrode, wherein:
    said measuring tube is embodied as one-piece;
    said first end region and said second end region of said measuring tube are flared; and
    said flared end regions of said measuring tube serve as axial stop surfaces for said loose flanges, via which said measuring tube is securable in the pipeline.

2. The apparatus as claimed in claim 1, further comprising:
    said flared end regions of said measuring tube are mountable to said loose flanges, which are secured to the pipeline.

3. The apparatus as claimed in claim 1, further comprising:
    a liner for said measuring tube, wherein:
    said liner also extends at least onto portions of said flared end regions of said measuring tube.

4. The apparatus as claimed in claim 3, wherein:
    said flanges and said measuring tube are comprised of different materials.

* * * * *